United States Patent
Maruyama et al.

(10) Patent No.: US 8,186,613 B2
(45) Date of Patent: May 29, 2012

(54) DEVICE AND METHOD FOR CUTTING AND WINDING A TUBULAR RESIN FILM

(75) Inventors: Toyotaro Maruyama, Kobe (JP); Masanori Ikenaga, Kobe (JP); Takeshi Takeuchi, Kobe (JP)

(73) Assignee: Sumitomo Bakelite Company, Ltd., Tokyo (JP)

( * ) Notice: Subject to any disclaimer, the term of this patent is extended or adjusted under 35 U.S.C. 154(b) by 526 days.

(21) Appl. No.: 11/991,298

(22) PCT Filed: Jun. 6, 2006

(86) PCT No.: PCT/JP2006/311299
§ 371 (c)(1),
(2), (4) Date: Jul. 20, 2009

(87) PCT Pub. No.: WO2004/067260
PCT Pub. Date: Aug. 12, 2004

(65) Prior Publication Data
US 2009/0294033 A1 Dec. 3, 2009

(30) Foreign Application Priority Data
Sep. 5, 2005 (JP) ................................ 2005-255905

(51) Int. Cl.
*B65H 23/24* (2006.01)
(52) U.S. Cl. .......... 242/615.11; 242/615.12; 242/615.21
(58) Field of Classification Search ............. 242/615.11, 242/615.12, 615.21
See application file for complete search history.

(56) References Cited

U.S. PATENT DOCUMENTS

| | | | | |
|---|---|---|---|---|
| 2,841,202 | A * | 7/1958 | Hirschy | 156/426 |
| 3,903,575 | A * | 9/1975 | Plaskett | 29/2.25 |
| 5,092,573 | A * | 3/1992 | Abreu | 270/52.08 |
| 7,073,747 | B2 * | 7/2006 | Weis | 242/615.1 |
| 7,100,864 | B2 * | 9/2006 | Weis | 242/615.12 |
| 2004/0021032 | A1* | 2/2004 | Berweger et al. | 242/615.21 |
| 2004/0089693 | A1* | 5/2004 | Weis | 226/10 |

(Continued)

FOREIGN PATENT DOCUMENTS
JP 40-5319 3/1940
(Continued)

OTHER PUBLICATIONS
PCT Notification of Transmittal of Translation of the International Preliminary Examination Report (Form PCT/IB/338) dated Jan. 2004.

(Continued)

*Primary Examiner* — Sang Kim
(74) *Attorney, Agent, or Firm* — Smith, Gambrell & Russell, LLP

(57) ABSTRACT

A device and method are provided for continuously manufacturing a thermoplastic resin film product of any width having a small film thickness and uniform flat surface at an excellent yield.

A tubular resin film cutting and winding device for cutting a tubular resin film 1a into a helical shape and winding a long film 1b, comprising a cutting device having a cutting member 2 for cutting a tubular resin film 1a; a winding device 4 for winding the cut long film 1b; and a guide rollers 3 for guiding the cut long film to the winding device, wherein the cutting member 2 and the guide rollers 3 have a mechanism for rotation in the circumferential direction of the tubular resin film.

15 Claims, 8 Drawing Sheets

U.S. PATENT DOCUMENTS

| | | | |
|---|---|---|---|
| 2004/0134321 A1* | 7/2004 | Weis | 83/99 |
| 2006/0240137 A1 | 10/2006 | Takeuchi et al. | |
| 2006/0269642 A1 | 11/2006 | Yoshida et al. | |

FOREIGN PATENT DOCUMENTS

| | | |
|---|---|---|
| JP | 47-34656 | 11/1972 |
| JP | 51-55368 | 5/1976 |
| JP | 55-59407 | 5/1980 |
| JP | 55-161619 | 12/1980 |
| JP | 63-22459 | 1/1988 |
| JP | 4-164626 | 6/1992 |
| JP | 10-226023 | 8/1998 |
| JP | 2003-215320 | 7/2003 |
| JP | 2004-20701 | 1/2004 |
| WO | 2004/067260 | 8/2004 |
| WO | 2004/067266 | 8/2004 |

OTHER PUBLICATIONS

PCT International Preliminary Report on Patentability (Form PCT/IB/373) dated Jan. 2004.
PCT Written Opinion of the International Searching Authority (Form PCT/ISA/237) dated Apr. 2005.
International Search Report.

* cited by examiner

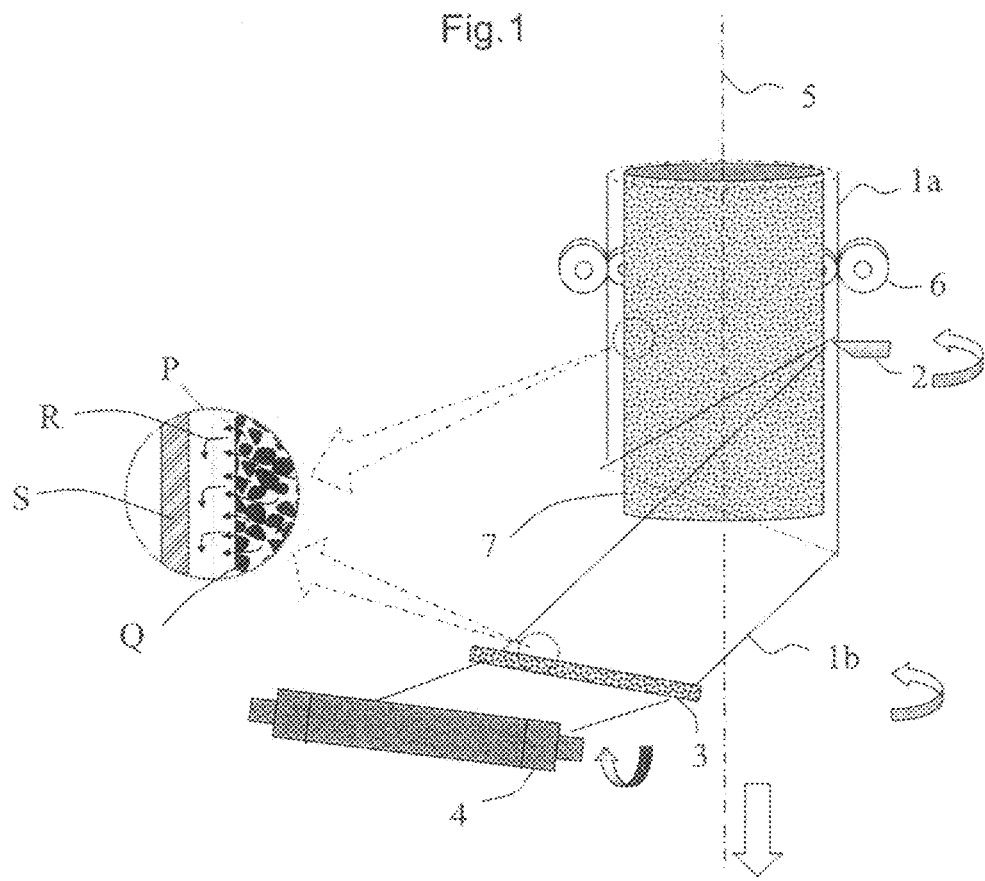
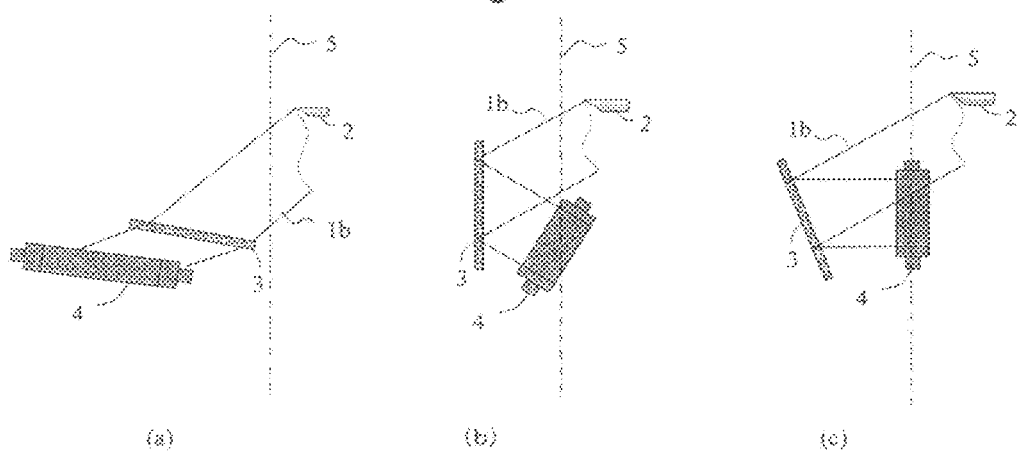

Before diameter widening → After diameter widening

Before diameter widening → After diameter widening (a)            (b)

DEVICE AND METHOD FOR CUTTING AND WINDING A TUBULAR RESIN FILM

TECHNICAL FIELD

The present invention relates to a device and method for cutting and winding a tubular resin film in which the raw material is a thermoplastic resin material. More specifically, the present invention relates to a device and method for cutting and winding a tubular resin film that may be used for optical films such as phase difference film and polarizing film, film for packaging such as shrink-wrap film, laminate film and barrier film, and films for industry such as dicing film, carrier tape, process film, printing film, and other films in which the film width and the orientation angle of the resin can be arbitrarily adjusted, and that can wind with high precision free of film damage, winding displacement, winding wrinkles, and winding bumps.

BACKGROUND ART

To date there has been a large amount of research and development by researchers and industry relating to thermoplastic resin films. Thermoplastic resin films have excellent mechanical properties, chemical resistance, transparency, and water vapor permeability while the raw materials are relatively inexpensive. Therefore, the films are used in a wide range of fields including packaging, miscellaneous goods, agriculture, industry, food, and medicine.

In recent years, there have been a large number of instances in which thermoplastic resin films are used in optics. Examples of thermoplastic resins include polycarbonates, cyclic polyolefins, polyethylenes, and polypropylenes. In particular, polycarbonates, cyclic polyolefins, and the like have relatively good optical transparency and are especially advantageously used in diffusion sheets, prism sheets, anti-reflective films, original phase difference films, and other undrawn products. Also the films can be endowed with optical anisotropy (orientation) when subjected to a drawing process (uniaxial or biaxial drawing). Films fabricated from a thermoplastic resin endowed with such an orientation can be advantageously used as phase difference films in liquid crystal displays (LCDs) and the like.

To date, various methods for producing such thermoplastic resins are known and have been put into practice. Examples of methods that are generally used to manufacture thermoplastic resin films on an industrial basis include solution casting in which a resin solution obtained by dissolving resin in a solvent is cast on a glass plate or the like to form a film, a T-die extrusion method in which molten resin is extruded through an extruder and then cooled over a chilled roll, a tube extrusion method in which molten resin is extruded in tubular form through an extruder, and an inflation extrusion method in which resin extruded in the form of a tube is molded while air pressure is applied to the interior of the tubular resin.

The film width of the thermoplastic resin films described above is determined by the width of the dies used in T-die extrusion method and by the width of the casting dies used in the solution casting method. It is difficult to match a single die to products having differing film widths, and unusable excess is produced in cases where the width of the die and the width of the product differ. The film width can be forcibly narrowed using the Deckle method, but there is a problem in that gel caused by the retention of resin is more readily produced. In the inflation extrusion method the film width can be changed while using a single annular die by changing the blow ratio, but the same quality film cannot necessarily be obtained because drawing state changes depending on the blow ratio. In the tube extrusion method, the tube diameter can be changed by varying the diameter of the sizing pipe, but the same quality is not always obtained and it is generally difficult to adjust the film width while maintaining the same quality because the drawing conditions are different.

Since the rate of cooling is ordinarily faster at the two ends of a film than at the center of a film, the quality of long films manufactured by the T-die extrusion method varies from the two ends of the film to the center. For this reason, a product that encompasses the entire width cannot be achieved, and the two ends of the film (the ear portions) are removed. Also, in cases where the thickness in the TD direction is not uniform, film bumps are readily generated when the film is wound, and the winding axis is sometimes moved back and forth (oscillated) in the axial direction in order to avoid this problem. In this case as well, the product yield is reduced because the two ends of the film must be cut away in order to align the width of the film. In relation to tubular films manufactured by the tube extrusion method and the inflation extrusion method, the ends of the film are ordinarily removed after the film has been folded and dismounted when the application is not a bag shape. Therefore, a product that encompasses the entire width cannot be achieved and yield is predictably reduced.

However, to manufacture a film such as a phase difference film in which the resin is oriented at a particular angle, a long film manufactured by the T-die method, solution cast method, tube extrusion method, inflation method, or the like is drawn in the TD and/or MD direction, and is cut so that the orientation of the resin matches the desired angle. In this case, unusable portions were generated at the two ends of the long film. In view of the above, a method of drawing the long film diagonally in T-die extrusion has been proposed with the intent of reducing the unneeded portions (e.g., see patent documents 1 and 2). With this method, the two ends of the film in the width direction are clamped using a jig and the film is conveyed. In this case, the film is conveyed so that the conveyance velocity in one direction of the width direction of the film is faster than that in the other direction, whereby the film is stretched in a diagonal fashion in temperature conditions in which the molecular orientation of the film resin can be changed.

As a method of manufacturing films of a resin at a certain angle, a method is proposed wherein the thermoplastic tubular resin film has been wound once around a roller or the like without cutting, the resin is thereafter unwound while being rotated, an insertion member or the like is inserted into the tubular resin film, and the film is cut and removed by use of fixed cutting while the tubular shape is restored (e.g., see patent documents 3, 4, and 5).

Also, a method of manufacturing a diagonally oriented thermoplastic resin film is proposed in which an annular die is rotated, whereby the thermoplastic resin film is caused to rotate while moving forward, the film is subsequently drawn along a single axis in the direction of progression, and the rotating tubular resin film is thereafter vertically bisected by a stationary knife (e.g., see patent document 6).

Another method of manufacturing diagonally oriented thermoplastic tubular resins is proposed in which the tubular resin film is extruded from a circular die, is thereafter momentarily cooled, and is then reheated, whereupon the tubular resin film is twisted while the tubular shape is maintained (e.g., see patent document 7). In the patent document mentioned above, a tubular die is fixed and a mandrel provided with suction slits is disposed on the inner side of the tubular resin film, the tubular resin film is brought into contact with the mandrel by suctioning, and the mandrel is rotated to thereby twist the tubular resin film.

Recently, it has been proposed that a resin film product can be fabricated in which the nonuniformity of thickness of the tubular resin film is reduced and which is provided with a small, uniform, flat surface by using stabilizing means, and that a high quality resin film product endowed with an orientation and having few thickness and drawing nonuniformities can be fabricated by passing the film through a drawing unit and holding unit made of a porous mandrel or the like and drawing the film (e.g., see patent documents 8 and 9). A tubular resin film manufactured by this method entails rotating the cutting device about the rotational axis in the lengthwise (MD) direction of the tubular resin film. A film of arbitrary width can be manufactured by adjusting the rate of rotation. Since the tubular resin film can be oriented at the same time in the MD direction or in the circumferential (TD) direction, a film having an arbitrary orientation can be obtained when the film is cut using the above mentioned cutting device. Similarly, a method of manufacturing a film having a diagonal orientation is known in which the cutting device rotates about the rotational axis in the lengthwise (MD) direction of the tubular resin film (e.g., see patent documents 10 and 11).

As described above, it is difficult to arbitrarily adjust the film width using an ordinary film manufacturing method. The unusable portion of the film greatly increases and it is necessary to recover and remanufacture the film, especially when a resin film is manufactured having an arbitrary orientation such as a phase difference film. On the other hand, there are various problems as described above when a film having an arbitrary orientation is manufactured.

In the T-die extrusion method, a method has been proposed in which the film is stretched diagonally, but since the transport rates of the two sides of the long film are different, it is difficult to control the drawing conditions and a complicated apparatus is used in achieving a uniform thickness and a uniform phase difference across the entire film surface. Also, since the ends of the film must be clamped in a jig, the clamped portion cannot be used as a product due to film damage.

In the method in which the tubular resin film is folded and wound around a roller or the like in a single process without being cut, the resin is thereafter unwound while being rotated, an insertion member or the like is inserted into the tubular resin film, and the film is cut and wound using fixed cutting means while the shape is restored to a tubular shape, a high-quality film cannot be produced because folding wrinkles are generated by folding the film in a single process. Also, wrinkles readily occur if the film is thin because the inserted member is moved while the tubular film is being rotated.

In the method in which the thermoplastic resin film is moved forward while being rotated due to the rotation of the annular die, and the rotating tubular resin film is drawn along a single axis in the direction of progression and is vertically cut by a stationary knife, folding wrinkles do not occur because the film is never folded. This method is characterized by rotating the annular die in order to cut the tubular film into a helical shape. However, the melting viscosity of the resin is high the moment it is extruded from the annular die, and it is therefore very easily affected by vibrations, nonuniformities in stress, nonuniformities in temperature, and nonuniformities in air quantity. In other words, when the annular die rotates, an external force is generated in the direction of rotation the moment the resin is extruded from the annular die such that the uniformity of the resin film thickness and the surface appearance readily deteriorate, and it becomes difficult to produce a high-quality resin film. Also, wrinkles are easily generated if the film is thin because the interior of the mandrel moves while the tubular film is rotated.

In the method of manufacturing a diagonally oriented thermoplastic tubular resin in which the tubular resin film is extruded from the annular die, is thereafter momentarily cooled, and is then reheated, whereupon the tubular resin film is twisted while the tubular shape is maintained, there is a possibility that the film surface will be damaged when the tubular resin film is brought into contact with the mandrel by suction, and there is a possibility of wrinkles forming in the film when the tubular resin film is heated and twisted in a softened state. As expected, it is difficult to obtain a high quality tubular film in this method as well because it is difficult to control the drawing conditions in order to achieve a uniform thickness and a uniform phase difference across the inside plane of the film.

On the other hand, with the method in which the cutting device rotates about the lengthwise (MD) direction of the tubular resin film in the manner shown in patent documents 10 and 11, the cutting and the weight of the winding device as such increases when the film being handled becomes wider and the line speed is accelerated, and considerable centrifugal force may be applied to the cutting and to the winding device. Therefore, the apparatus and the support body for supporting these become bulky. Also, because the rotational angular velocity of the cutting device increases together with the increase in line speed, the cutting device is made bulky so as to withstand the centrifugal force. It is very likely that equipment costs would increase because a large installation location must be used. Furthermore, in cases where the rotation speed has been increased, the operation of first winding the film onto the roller and the operation of exchanging film rolls become difficult, and there are areas of uncertainty in term of safety.

[Patent Document 1] Japanese Laid-open Patent Application No. 4-164626

[Patent Document 1A] Japanese Laid-open Patent Application No. 2004-20701

[Patent Document 3] Japanese Laid-open Patent Application No. 10-226023

[Patent Document 4] Japanese Laid-open Patent Application No. 51-55368

[Patent Document 5] Japanese Laid-open Patent Application No. 55-59407

[Patent Document 6] Japanese Patent Publication (Kokoku) No. 40-5319

[Patent Document 7] Japanese Laid-open Patent Application No. 47-34656

[Patent Document 8] WO2004-067260

[Patent Document 9] WO2004-067266

[Patent Document 10] Japanese Laid-open Patent Application No. 2003-215320

[Patent Document 11] Japanese Laid-open Patent Application No. 55-161619

DISCLOSURE OF THE INVENTION

Problems that the Invention is Intended to Solve

The present invention was contrived in view of the foregoing problems, and an object thereof is to provide a device and method for cutting and winding a tubular resin film in which the film width and the orientation angle of the resin can be arbitrarily adjusted, the film can be wound with high precision without film damage, winding displacement, winding wrinkles, and winding bumps, and the entire device is compact. Also, a resin film having an arbitrary orientation angle can be manufactured with good yield by using the cutting and winding method of the present invention, and the method can be advantageously used in the manufacture or the like of a phase difference film.

The first aspect of the present invention is a tubular resin film cutting and winding device for cutting a tubular resin film into a helical shape and winding a long film, comprising a cutting device having a cutting member for cutting the tubular resin film; a winding device for winding the cut long film; and a guide roller for guiding the cut long film to the winding device, wherein the guide roller has a fluid-exuding mechanism for exuding a fluid, and the cutting member and the guide roller have a mechanism for rotation in the circumferential direction of the tubular resin film.

In accordance with this aspect, the direction of progression of the cut long film can be suitably modified by the guide roller. As a result, the degree of freedom in positioning the cutting and winding device is increased. For this reason, the apparatus can be prevented from increasing in size in the conventional manner. Also, winding displacement and winding wrinkles caused by the positional displacement of the long film can be prevented because the guide roller guides the cut long film to the winding device.

Fluids can be exuded from the surface of the guide roller because the guide roller has a fluid-exuding mechanism for exuding fluids. For this reason, the long film and the guide roller make contact and are connected via the fluid, and friction between the long film and the guide roller is reduced. As a result, damage, clinging, and drifting of the film can be prevented, and the film can be smoothly conveyed.

As a result of the above, it is possible to wind a film with high precision without film damage, winding displacement, winding wrinkles, and winding bumps, and to obtain a cutting and winding device for a tubular resin film that allows the entire apparatus to be made compact.

The second aspect of the present invention is that the guide roller is composed of a porous material.

The guide roller is composed of a porous material, whereby fluid can be uniformly exuded from the surface of the guide roller. For this reason, local variations in the flow rate of the exuded fluid are substantially eliminated. Therefore, the non-contact characteristics between the resin film and the guide roller are further enhanced. As a result, damage, clinging, and drifting of the film can be prevented, and the film can be smoothly conveyed.

The third aspect of the present invention is that the fluid is a gas.

This aspect can prevent fluid from adhering to the long film after cutting because the fluid is a gas. For this reason, an apparatus for removing the fluid is not separately required when the long film is being wound. As a result, the apparatus can be made more compact.

The fourth aspect of the present invention is that a core member is provided inside the tubular resin film.

In the manner of this aspect, a core member is provided inside the tubular resin film, whereby the shape of the tubular resin film can be reliably held when the tubular resin film is conveyed and cut. For this reason, the film can be reliably cut to a prescribed shape and size, because the film can be prevented from deforming when the tubular resin film is cut.

The fifth aspect of the present invention is that the core member has a mechanism for exuding a fluid.

In accordance with this aspect, a mechanism in which fluids are exuded from the core member is provided, and fluid can therefore be exuded from the surface of the core member. For this reason, the non-contact characteristics between the tubular resin film and guide roller can be enhanced, and friction between the tubular resin film and the guide roller is reduced. As a result, damage, clinging, and drifting of the film can be prevented, and the film can be smoothly conveyed.

The sixth aspect of the present invention is that the core member is composed of a porous material.

The core member is composed of a porous material, whereby fluid can be uniformly exuded from the surface of the core member. For this reason, local variations in the flow rate of the exuded fluid are substantially eliminated. Therefore, the non-contact characteristics between the resin film and the guide roller are further enhanced. As a result, damage, clinging, and drifting of the film can be prevented, and the film can be smoothly conveyed.

The seventh aspect of the present invention is that the fluid is a gas.

This aspect can prevent fluid from adhering to the long film after cutting because the fluid is a gas. For this reason, an apparatus for removing the fluid is not separately required when the long film is being wound. As a result, the apparatus can be made more compact.

The eighth aspect of the present invention is that the core member has a mechanism for changing the diameter in the circumferential direction of the tubular film.

In accordance with this aspect, the device can be used with films having various diameters because the diameter of the core member can be changed. Also, the tension can be adjusted depending on the material and the like of the tubular resin film. As a result, the applicability of the apparatus can be expanded.

The ninth aspect of the present invention is that the center axis of the tubular resin film matches the winding axis of the winding device.

In accordance with this aspect, the size of the apparatus in the radial direction can be reduced because the winding device and the tubular resin film are coaxially disposed. As a result, the apparatus can be made more compact.

The tenth aspect of the present invention is that the winding device has a mechanism for rotation in the circumferential direction of the tubular resin film.

In accordance with this aspect, the relative positions of the winding device and the cutting device can be kept constant because the winding device can rotate about the circumferential axis of the tubular resin film. As a result, the cut film can be reliably wound by the winding device.

The eleventh aspect of the present invention is that an exchange device that can continuously exchange film rolls wound in the winding device is provided.

In accordance with this aspect, the apparatus is not required to be stopped when the film rolls are exchanged because the wound film rolls are continuously exchanged by the exchanging apparatus. As a result, the production efficiency of the long film can be increased.

The twelfth aspect of the present invention is that two or more each of the cutting members and the guide rollers are provided.

In accordance with this aspect, the production efficiency of long films can be increased because the tubular resin film is cut by a plurality of cutting members and a plurality of long films can be obtained.

The thirteenth aspect of the present invention is that a mechanism is provided for automatically adjusting the width of the long film by using the rotational angular velocity at which the cutting device rotates in the circumferential direction of the tubular resin film, and by using the conveyance velocity of the tubular resin film.

In accordance with this aspect, the rotational angular velocity of the cutting device and the conveyance velocity of the tubular resin film can be adjusted and a long film having a prescribed width can be obtained.

The fourteenth aspect of the present invention is that two or more conveyance devices conveying the tubular resin film in the lengthwise direction are provided to a circumference of the tubular resin film.

In accordance with this aspect, the tubular resin film can be conveyed in a uniform manner in the radial direction.

The fifteenth aspect of the present invention is a cutting and winding method for cutting a tubular resin film into a helical shape and winding the long film, including a step in which a cutting device having a cutting member for cutting the tubular resin film rotates in the circumferential direction of the tubular resin film to thereby cut a helical long film; a step in which a guide roller rotates in the circumferential direction of the tubular resin film while exuding a fluid to thereby guide the cut long film to a winding device; and a step for winding the long film using the winding device.

In accordance with this aspect, winding displacement and winding wrinkles caused by positional displacement of the long film can be prevented because the guide roller guides the cut long film to the winding device. Also, the long film and the guide roller make contact or come into close proximity because the guide roller exudes a fluid, and friction between the tubular resin film and the guide roller is reduced. As a result, damage, clinging, drifting, and the like of the film can be prevented, and the film can be smoothly conveyed.

As a result of the above, it is possible to wind the film with high precision without film damage, winding displacement, winding wrinkles, and winding bumps.

The sixteenth aspect of the present invention is that the width of the long film is automatically adjusted by using the rotational angular velocity at which the cutting device rotates in the circumferential direction of the tubular resin film, and by using the conveyance velocity of the tubular resin film.

In accordance with this aspect, the rotational angular velocity of the cutting device and the conveyance velocity of the tubular resin film can be adjusted and a long film having a prescribed width can be obtained.

The seventeenth aspect of the present invention is that the arrangement of the guide roller and/or the winding device is adjusted in coordination with the rotational angular velocity of the cutting device and the conveyance velocity of the tubular resin film.

In accordance with this aspect, the rotational angular velocity of the cutting device and the conveyance velocity of the tubular resin film can be coordinated, and the position of the guide roller and/or the winding device mentioned above can be suitably established. As a result, the quality of the long film to be manufactured can be improved.

BRIEF DESCRIPTION OF THE DRAWINGS

FIG. 1 is a schematic diagram showing an example of the tubular resin film cutting and winding device of the present invention;

FIG. 2 is a schematic diagram showing an example in which the position of the winding device is modified by the guide roller;

KEY

Figure 3:
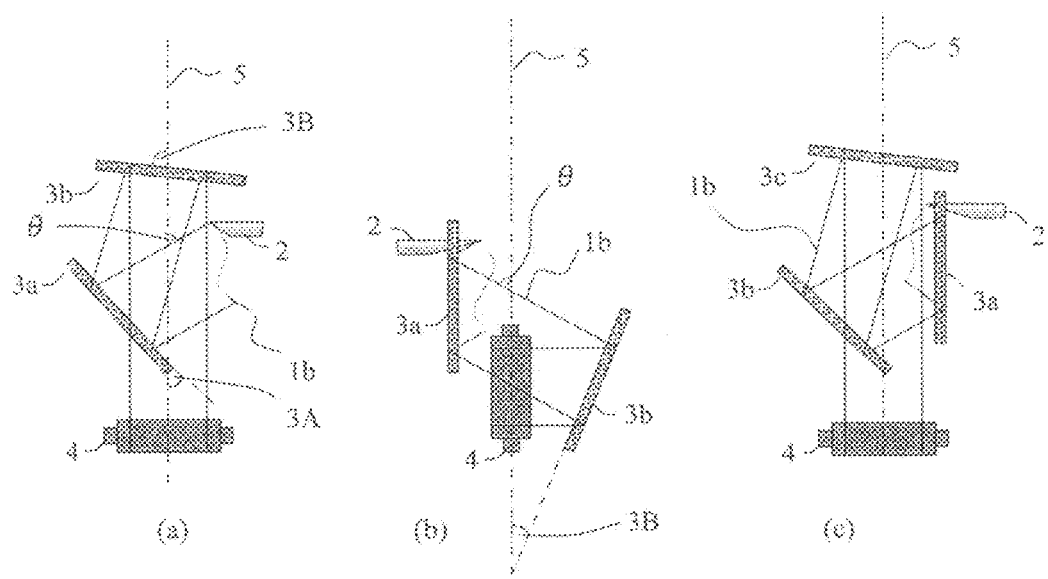
FIG. 3 is a schematic diagram showing an example of a cutting and winding device in which two or more guide rollers are used.

1 Tubular resin film
2 Cutting device
3 Guide roller
4 Winding device
5 Center axis of the tubular resin film
6 Conveyance device
7 Core member
8 Central rod
9 Turret
10 Replacement winding roller
100 Tubular resin film manufacturing apparatus
101 Hot extrusion machine,
103 Metal cap
104 Stabilizing means
107 Mandrel

BEST MODE FOR CARRYING OUT THE INVENTION

Embodiments the present invention will be described below with reference to the accompanying drawings. The present invention is not limited to the configuration described in the embodiments and drawings below, and all modifications are possible in a range that can be implemented by those skilled in the art.

The cutting and winding device described in the present specification is preferably connected to the extrusion molding apparatus and/or the drawing apparatus described in patent documents 8 and 9, and continuously cuts and winds the tubular resin film after it has been manufactured. However, application can also be made to cases in which the tubular resin is separately manufactured in advance. Also the tubular resin film manufacturing device used in the present invention is not limited to the tubular resin film manufacturing devices of patent documents 8 and 9.

SUMMARY

The cutting and winding device of the present invention has a cutting device 2 for cutting a tubular resin film into helical shapes in the same manner as the embodiment shown in FIG. 1, as well as at least one or more guide rollers 3 and a winding device 4. The transport velocity of a tubular resin film 1a is kept constant and the rotational speed at which the cutting device 2 rotates about the center axis 5 of the tubular resin film 1a is adjusted, whereby a long film 1b of arbitrary width can be manufactured. As long as the tubular resin film 1a is used in which the resin is oriented in the direction of the center axis 5 (MD), or in the peripheral (TD) direction, a long film having an arbitrary orientation angle can be manufactured by adjusting the rotational angular velocity of the cutting device 2.

Here, the cutting device 2 rotates in the circumferential direction of the tubular resin film 1a, and the tubular resin film 1a does not rotate. Therefore, there is no concern that vibrations or the like will be imparted to the resin film immediately after extrusion, and a high-quality film can be manufactured with excellent thickness precision and external film appearance in the case that the film is not directly connected to the extrusion machine.

To enable the direction in which the film advances to be changed freely by the guide rollers 3, the positioning of the winding device 4 is allowed a greater degree of freedom, and the equipment design is simplified, particularly with respect to the tubular resin film cutting and winding device. Film can also be wound without any winding displacement or winding wrinkles. For example, if the guide rollers 3 are arranged as shown in FIG. 2(a), the winding axis of the winding device 4 can be made horizontal relative to the floor. Here, the term "winding axis" is meant to refer to the rotational axis of the roller that winds the film. Also, if the guide rollers 3 are placed as shown in FIGS. 2(b) and 2(c), the winding axis of the winding device 4 can be slanted diagonally or vertically relative to the floor. In the case of FIG. 2(a), even if the winding tension of the film is low, there is no danger of the film slipping in the direction of the winding axis due to the weight of the film being wound. Also, in FIGS. 2(b) and 2(c), the placement of the winding device 4 requires less floor space than the placement in FIG. 2(a). Furthermore, in FIG. 2(c), if the winding device 4 can rotate about the winding axis, the equipment design is simplified because the winding device itself does not need to rotate. Moreover, since the cutting and winding device can be made more compact, the operations of rolling the film onto a new roller and exchanging film rolls are more efficient and stable even if the rate of production is greatly increased.

On the inside of the tubular resin film 1a are core members 7 composed of a porous material, and the guide rollers 3 are also composed of a porous material 3x. Therefore, fluid exuded from the porous materials can result in reduced contact between the film and the guide rollers or between the film and the core members as the film is conveyed, thus reducing the amount of damage from film slipping. The magnified portion P in FIG. 1 shows the exuded fluid (Q: porous material, R: direction of flow, S: film).

Furthermore, even in cases in which the circumferential thickness of the tubular resin film 1a fluctuates widely, since the long film 1b is cut into a helical shape, the locations of irregularities in thickness move along the width of the cut long film 1b, and winding bumps are prevented from forming even after the film is wound into a roll.

(Cutting Device)

Possible examples of cutting devices that can be used in the cutting device 2 include contact-type cutting devices that cut the film by making contact, such as metal blades, ceramic blades, heat generating materials such as nichrome wire, ultrasonic cutting devices, high-frequency cutting devices, water jet cutting devices and the like; as well as non-contact-type cutting devices that cut the film without making contact, such as laser cutters and the like. Metal blades that are inexpensive and durable are most suitable for contact-type cutting members. Metal blades have various shapes, including the usual cutter blades, round blades that cut as they rotate, and other such blades. The tip of the blade tip is preferably as sharp as possible, with no imperfections. Possible examples of non-contact-type cutting devices include carbon dioxide lasers, YAG lasers, excimer lasers, infrared lasers, UV lasers, semiconductor lasers, and the like, but a laser cutter that uses a carbon dioxide laser is the most suitable for its comparatively inexpensive cost and high cutting power.

(Cutting Method)

One example of a method of cutting the tubular resin film into a helical shape is a method wherein the cutting member is, i.e., a metal blade or another such contact-type cutting device, and in which the metal blade is attached to a ring or the like encircling the circumference of the tubular resin film 1a, and the ring is made to rotate by a motor or the like. At this time, the tubular resin film 1a is conveyed by a conveyance device 6.

To cut the film steadily, it is preferable to implement feedback control or the like while measuring the tension on the metal blade so that the film does not snare on the metal blade. This feedback control would be capable of instantly and precisely adjusting the conveyance velocity of the tubular resin film 1a, the rotating speed of the metal cutting blade, and the angle of the cutting blade. To ensure that the wiring for the motor and the like does not become intertwined, it is preferable that the electrical drive system of the motor and the like be organized and fixed in place as much as possible, that the rotating ring or the like be configured as a gear, and that the metal blade be made to rotate. The angle of the metal blade is preferably adjusted by battery power, as this would simplify wiring.

When using a non-contact-type cutting member, such as a laser cutter that uses a carbon dioxide gas laser, the tubular resin film 1a can be cut into a helical shape without directly moving the laser itself. This is because the direction in which the laser light is emitted can be varied at will by using remote control or the like to vary the orientation of the prism through which the laser light passes. However, there are many cases where the composition of the apparatus itself becomes complex, and safety measures become necessary because of a danger of the laser light striking a human body and the like.

(Guide Rollers)

The guide rollers 3 are preferably capable of conveying the film without any film damage. Possible examples of guide rollers include rolls that rotate (spin) around their own longitudinal axis, rolls composed of Teflon (registered trademark) or other such fluorinated resin materials that have little surface free energy in portions where contact is made with the film, and rolls that have a porous or fibrous structure on surfaces that contact the film.

Other possible examples include rolls having a structure capable of exuding fluids such as gases or liquids and provided with slits in the surfaces of guide rollers 3, and rolls having a structure that allows fluids to be supplied. Above all, a preferable structure is one in which the surface of the film is less likely to be damaged, the direction that the film advances can be freely changed, and fluids can be exuded, and which is furthermore composed of a porous materials.

The aforementioned holes in the porous material, the slit, and other such features constitute a fluid exude mechanism. A flexible tube (not shown), a rotary joint (not shown), or the like, for example, connects the guide rollers 3 to, i.e., an air compressor, a pump, or another such fluid-supplying device (not shown) for supplying fluid to the guide rollers.

Should the guide rollers only be able to rotate about their own longitudinal direction, if the direction in which the film advances is not perpendicular to the longitudinal direction of the rolls, the guide rollers will instead hinder the advancement of the roll film and potentially cause winding wrinkles, winding displacement, and marks in the film. (Since the direction in which the film advances is different from the direction in which the guide rollers rotate, the film does not advance smoothly when the film makes contact with the guide roller, and ridges and marks form in the film.) However, since contact between the long film 1b and the guide roller can be reduced by the fluid exuded from the guide rollers 3, the aforementioned problems can be resolved.

Preferable options for fluids include solutions that have low boiling points below 100° C. and that contain water, alcohol, esters, or hydrocarbons; or gases such as air, nitrogen, or helium. The most preferable are water, which is inexpensive, or air, which is unlikely to leave impurities from the fluid on the surface of the film.

(Guide Roller Materials)

The guide rollers 3 preferably contain a porous material as a structural element. Since the fluid can be exuded evenly through the surfaces of these components, there is little local variation in the amount of exuded fluid. Consequently, since contact between the long film 1b and the guide rollers 3 is further reduced, the film can be inhibited from being damaged, from snaring, and from wobbling, thus allowing the film to be smoothly conveyed. As long as the fluid can be exuded from the material evenly, the material is not particularly limited to metal, plastic, or the like.

Possible examples of porous materials include metallic porous materials (porous powder sintered metals, sintered metal meshes, and the like), inorganic porous materials (porous ceramics and the like), filter materials, metals provided with many holes, organic porous materials (such as silicone, and fluorinated resins such as Teflon (registered trademark)), and the like. The porous materials should preferably be adjustable in hole diameter, thickness, and other such features so as to allow the fluid to be exuded evenly. Taking into consideration the durability, ease of maintenance, and uniformity of fluid exude, metal porous materials are preferred, with porous powder sintered metals and sintered metal meshes being most preferable.

(Guide Roller Structure)

The fluid exuded from the guide rollers 3 should be exuded only where it is needed and in the amount needed. In other words, exude is desirable to the extent that it reduces contact between the guide rollers 3 and the film 1b. Air, being the least expensive, is generally the most preferable example of the fluid exuded from the guide rollers 3.

Figure 4:
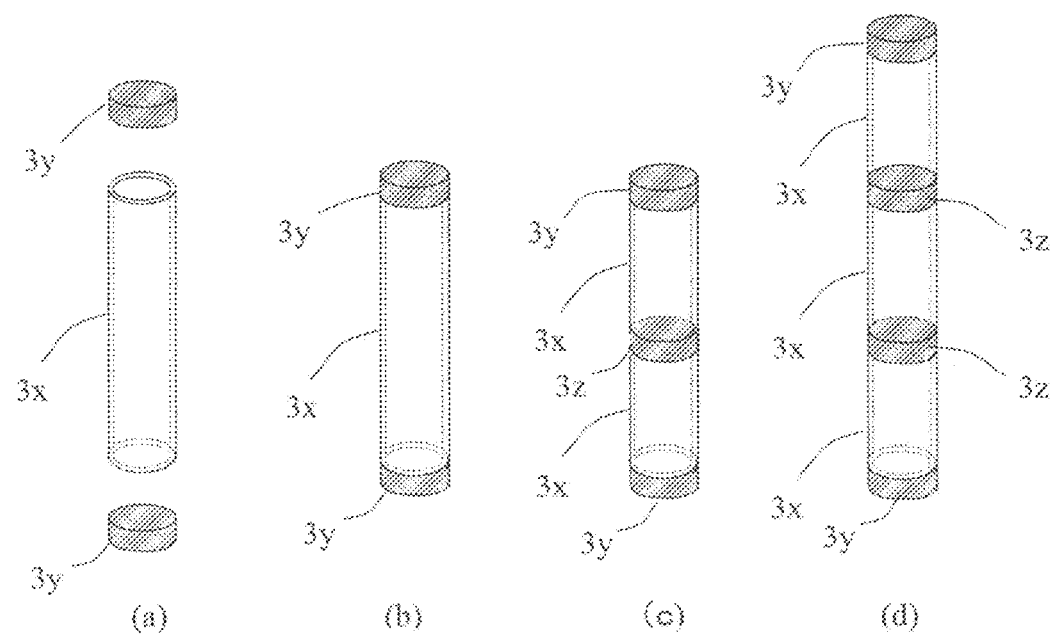
FIG. 4 is a schematic diagram showing an example of the structure of a guide roller.
Figure 5:
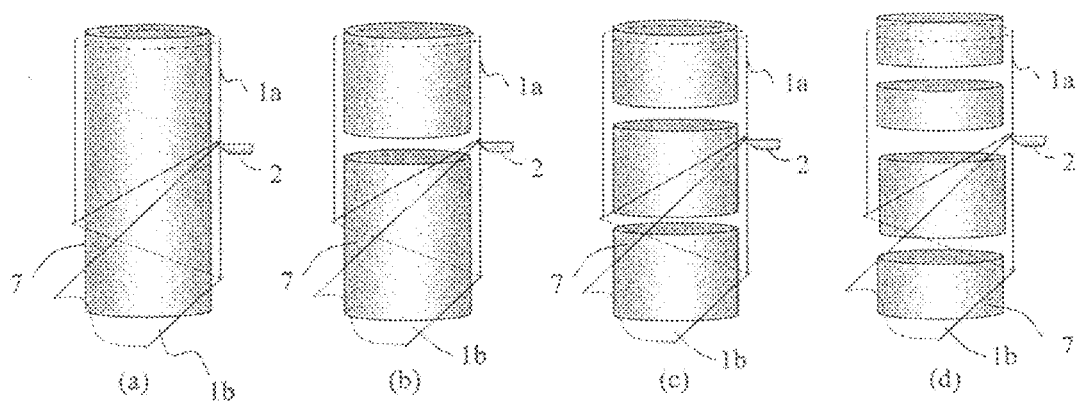
FIG. 5 is a schematic diagram showing an example in which a core member is divided vertically relative to the center axis of the tubular resin film.

A possible example for the structure of the guide rollers 3 is shown in FIG. 4(b). In FIG. 4(b), each of the rollers is made of a cylindrical porous material 3x that has had the core removed, and two discoid covers 3y, as is also shown in FIG. 4(a). Injecting the fluid through either of these covers causes the fluid to be exuded uniformly from the porous material 3x. The surface of porous material 3x can be provided with a shutter or the like so that fluid will not be exuded from that portion of the guide rollers 3. Doing so makes it possible to use the fluid effectively. It is also possible to divide the porous material 3x into a plurality of sections and exude the fluid separately, as shown in FIGS. 4(c) and 4(d). Separately controlling the amount of fluid makes it possible to minutely adjust the conveyance of film. For example, the film 1b passing over the guide rollers 3 can be centered simply by controlling the amount of fluid. It is preferable that the diameter of the cylindrical coupling component 3z be smaller than the diameter of the porous material 3x, and that the underside portion of the porous material 3x that comes into contact with the coupling component 3z be round to prevent the film from snaring and being damaged as the film is conveyed.

(Methods of Using the Guide Rollers)

As shown in FIG. 1, it is preferable that the guide rollers 3 rotate (revolve) around the center axis 5 of the tubular resin film. Since tension can be maintained between the resin film 1b and the winding device 4 by rotating (revolving) the guide rollers 3, the resin film is less prone to ridges and winding displacement, and the film can be wound at high speeds.

Moreover, the design of the cutting and winding device is even easier to implement because the direction in which the film advances has a greater degree of freedom, owing to the use of two or more guide rollers. For example, the use of two guide rollers as shown in FIG. 3(a) allows the winding device 4 to be moved closer to the center axis 5 of the tubular resin film, and also requires less floor space for setting up the winding device. In this case, the respective angles of guide rollers 3a and 3b are interdependent. In FIG. 3(a), where 3A is defined as the angle between the center axis 5 and the guide rollers 3a, 3B is defined as the angle between the center axis 5 and the guide roller 3b, and θ is defined as the angle at which the film is cut, it is preferable that the angles 3B and 3A be adjusted to achieve the relationship $3B=\theta/2+3A$.

The use of two guide rollers as in FIG. 3(b) or three guide rollers as in FIG. 3(c) allows for a shorter distance between the cutting device 2 and the guide roller 3a. Vibration in the film during cutting can therefore be inhibited, and cutting precision is increased in terms of the linearity of the cut surface of the film and other such factors. The respective angles of the guide rollers 3a, 3b, and 3c are interdependent in this case as well. For example, in FIG. 3(b), if 3A is 0, it is preferable that the angles 3B and 3A be adjusted to achieve the relationship $3B=45°-\theta/2$.

When the apparatus of the present invention is used to adjust the film width of the long film 1b being wound, the rotational angular velocity of the cutting device 2 and the conveyance velocity of the tubular resin film 1a are adjusted. In addition, since the conveyed location of the cut long film 1b also varies, it is better for the placement of the guide rollers 3 to be adjusted in a corresponding manner, as this prevents winding displacement and winding wrinkles.

Furthermore, it is preferable to be able to automatically adjust the angle, position, and other factors in placing the guide rollers 3. For example, while the cutting and winding procedure of the present invention is being carried out, in cases of variation in the cylindrical circumference of the tubular resin film or in the helical pitch of a film being cut into a helical shape, fluctuation in the travel position of the moving film may potentially cause winding displacement or winding wrinkles in the wound film. Film winding displacement and winding wrinkles can be prevented if the angle and position of the guide rollers 3 can be automatically adjusted in response to fluctuation in the travel position of the moving film. It is also preferable to measure tension in the widthwise direction of the film and to provide feedback and vary the angles and positions of the guide rollers 3 so that tension in the widthwise direction remains uniform during operation, as this prevents winding displacement and winding wrinkles in the film.

(Winding Device)

The winding device 4 preferably comprises, i.e., a contact roller for preventing the winding roller from capturing air; an expander roller for eliminating film wrinkles; a pinch roller for cutting film tension; various kinds of rollers such as a dancer roller for controlling stress on the film; a motor that can control the rotational speed and torque; online testing apparatuses for tension, thickness, foreign substances, phase difference, and other such film characteristics; online testing apparatuses for wound film diameter, travel position, and the like, as well as guides that provide feedback from these online testing apparatuses; and a control device that drives the motor. The winding device also preferably comprises a multiaxial turret as a device for exchanging the next new winding center when the wound film reaches a certain length, a cutting device to cut the long film widthwise, a collection device to collect the scraps when the film is cut, and the like. The winding device further preferably comprises a device for improving the surface of the film, such as a corona exude device or an antistatic device.

(Method of Using the Cutting Device)

It is preferable that the winding device 4 rotate (revolve) around the center axis 5 of the tubular resin film in order to wind the cut tubular resin film without any wrinkles when the direction of the winding axis of winding device 4 is not parallel to the center axis 5 of the tubular resin film, as shown in FIGS. 2(a) and 2(b). In cases in which the direction of the winding axis of the winding device is parallel to the center axis 5 of the tubular resin film as shown in FIG. 2(c), there is no need to rotate (revolve) the winding device 4, and the film can be wound without wrinkles simply by rotating the winding axis. However, in cases in which the direction of the winding axis is not parallel to the center axis 5 of the tubular resin film, it is of course preferable that the winding device 4 rotate about the center axis 5 of the tubular resin film.

In cases in which the direction of the winding axis of the winding device is not perpendicular to the direction in which the tubular resin film advances, as shown in FIG. 2(b) or FIG. 2(c), the film may slip due to the weight of the wound film when the winding torque decreases or when the surface of the film is prone to be slippery. In this case, attaching a guard to both ends of the winding rolls, holding down the film with a contact roll, or another such measure can prevent winding displacement. In cases in which the direction of the winding axis of the winding device is perpendicular to the direction in which the tubular resin film advances as shown in FIG. 2(a), the film will not slip due to the weight of the wound film.

When the apparatus of the present invention is used to adjust the film width of the long film 1b, the rotational angular velocity of the cutting device 2 and the conveyance velocity of the tubular resin film 1a must be adjusted. In addition, since the conveyed position of the cut long film 1b also fluctuates, the arrangement of the winding device 4 is also preferably adjusted in a corresponding manner, as this reduces winding displacement and winding wrinkles.

In cases in which there is variation in the cylindrical circumference of the tubular resin film or in the helical pitch of a film being cut into a helical shape during the cutting and winding procedure of the present invention, fluctuation in the travel position of the moving film may potentially cause winding displacement or winding wrinkles in the wound film. It is preferable to be able to automatically and arbitrarily adjust the position of the winding device 4 relative to the travel position of the film, which is found by measuring the positions of the film ends, the stress in the widthwise direction of the film, and the like.

(Exchanging Film Rolls)

Figure 9:
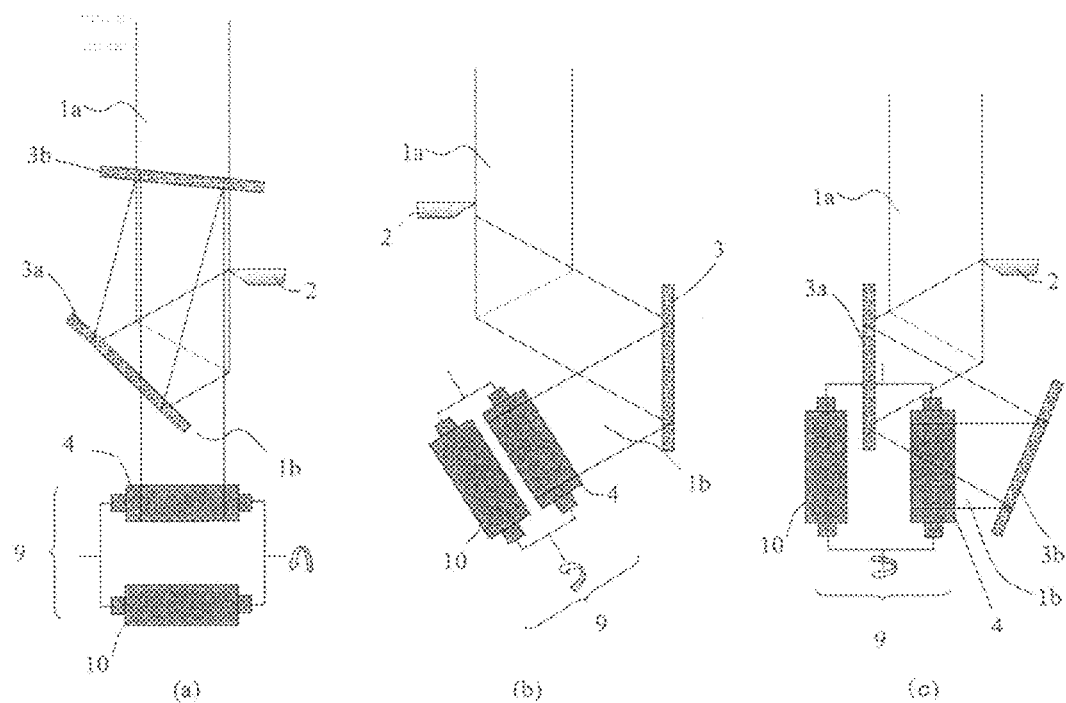
FIG. 9 is a schematic diagram showing an example of a cutting and winding device that shows the arrangement of a replacement winding roller.

In cases in which film is being continuously produced, it is preferable that wound film rolls be continuously exchanged. As shown in FIG. 9(a), for example, a replacement winding roller 10 is placed parallel to the winding roller 4. After the weight of the film wound to the winding roller 4 reaches a set value, a turret 9 is rotated and the winding roller 4 and the exchange roller 10 simultaneously switch places. At this time, the film is cut by a cutting device (not shown) while the film tension is controlled by a pinch roller or the like, and the rolls are exchanged. The same kind of exchange can be performed with the examples shown in FIGS. 9(b) and 9(c). The film rolls can also be continuously exchanged using an accumulator.

(Winding a Plurality of Films)

Figure 10:
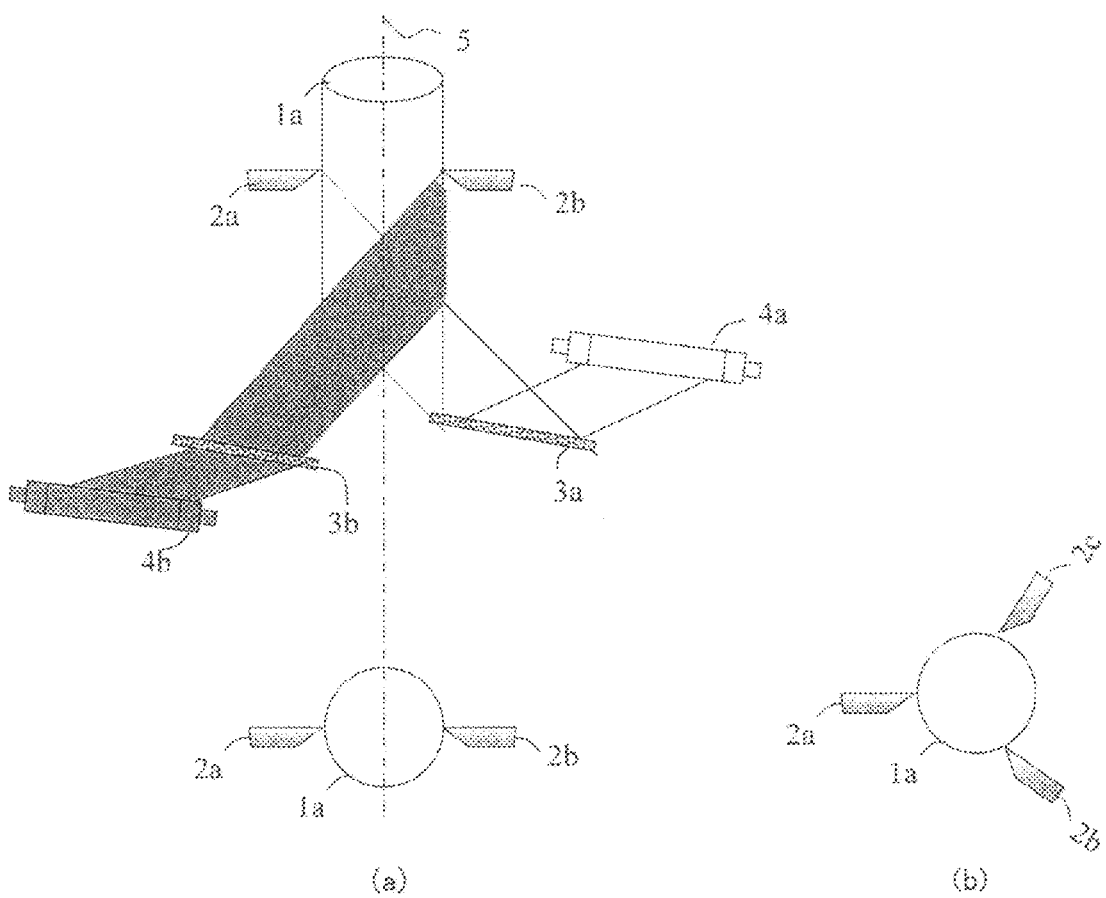
FIG. 10 is a schematic diagram showing an example of a cutting and winding device for simultaneously manufacturing a plurality of film rolls.

Providing two cutting devices having a cutting member makes it possible to simultaneously produce two resin films, as shown in FIG. 10(a). At this time, as long as there are two cutting members, one cutting device will suffice. The width of the films wound by the winding devices 4a and 4b can be modified by modifying the distance of the cutting devices 2a and 2b from the circumference of the tubular resin film 1a. More guide rollers than cutting members are needed, and in FIG. 10(a) there are preferably two or more guide rollers. It is also preferable that the winding devices 4a and 4b and the guide rollers 3a and 3b rotate about the center axis 5 of the tubular resin film at the same speed. Providing three guide rollers (not shown) and three cutting devices 2, each having a cutting member, around the circumference of the tubular resin film 1a as shown in FIG. 10(b) makes it possible to simultaneously produce three resin films.

(Core Member)

Figure 13:
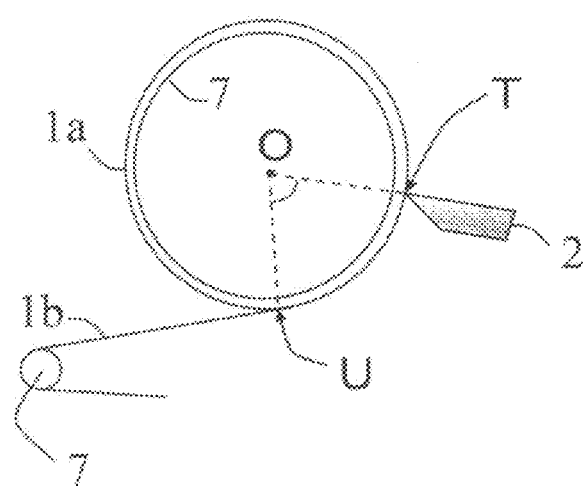
FIG. 13 is a schematic diagram showing the positional relationship of a core member and a film when viewed along the central axis direction of the tubular resin film.

A core member 7 is preferably provided inside the tubular resin film 1a, as shown in FIG. 1. Tension is generated in the direction of progression of the long film when the long film 1b is conveyed after cutting. For this reason, in the particular case that the film is thin, the tubular resin film 1a is less liable to keep a tubular shape prior to cutting if the core member 7 is not present. Therefore, the film is more difficult to cut in a linear fashion, and as a result, it is possible that the width of the long film will not be constant after cutting. It is therefore preferred that the winding angle of the cut long film 1b with respect to the core member 7 be greater than 0° and 360° or less. The winding angle, as shown in FIG. 13, refers to the central angle ∠TOU of an arc in the direction that includes the cut long film 1b, wherein O is the center point of the tube when the tubular resin film 1a is viewed along the direction of the central axis of the tubular resin film, T is the point where the tubular resin film is cut by the cutting device 2 provided with a cutting member, and U is the point at which the cutting line composed of the end face of the cut long film 1b changes from a curve to a straight line (i.e., the point at which the cutting line composed of the end face of the long film 1b separates from the core member). Here, when ∠TOU is 0° or less, linearity of the cut portion may be reduced, potentially causing winding displacement because there is the possibility that the distance between the core member 7 and the tubular resin film 1a will vary at the point T at which the tubular resin film 1a is cut by the cutting member. When the linearity of the cut is reduced, the effective width of the film is reduced because the film width is not uniform. Also, when ∠TOU is greater than 360°, there is a possibility that the cut long film 1b itself will overlap and obstruct the conveyance of the film, depending on the shape of the core member 7, and such a situation is not preferred because the size of the apparatus is increased. It is more preferred that ∠TOU be between 5° and 180°, and 30° and 90° is even more preferred.

(Core Member Material)

It is preferred that the core member 7 contain a porous material as a constituent element. A fluid can thereby be uniformly exuded from the surface of the core member. As a result, damage, clinging, drifting and the like of the film can be prevented because the non-contact characteristics between resin film 1b and core member 7 are enhanced.

Examples of porous materials include metallic porous materials (porous powder sintered metal, sintered metal screens, and the like), inorganic porous materials (porous ceramics and the like), filter materials, metal provided with numerous holes, and organic porous materials (Teflon (registered trademark) and other fluorinated resins; silicone, and the like). The porous material is preferably one in which the hole diameter, thickness, and the like can be adjusted so that the fluid can be uniformly exuded. Also, a metal porous material is preferred and porous powder sintered metal and sintered metal screens are most preferred when durability, ease of maintenance, and uniformity of the fluid-exuding state are considered.

(Structure of the Core Member)

The shape of the core member 7 may be divided vertically in the center axis direction of the tubular resin film, as shown in FIGS. 5(a) to 5(d). Fluid can be used efficiently because the fluid flow rates can be controlled by vertically dividing the core member 7.

The cutting member of the cutting device 2 may be disposed in a location that faces the core member portion, as shown in FIGS. 5(a) and 5(c), or may be disposed in a location that faces the gap between the vertically divided core members, as shown in FIGS. 5(b) and 5(d).

Figure 6:
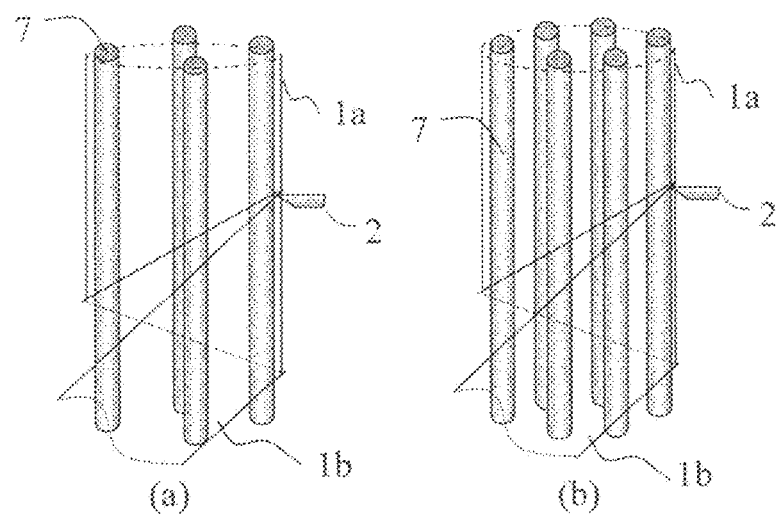
FIG. 6 is a schematic diagram showing an example in which a core member is divided horizontally relative to the center axis of the tubular resin film.

Also, the core member 7 may be divided in a plurality of locations parallel to the center axis 5 of the tubular resin film, as shown in FIGS. 6(a) and 6(b). The cost of the members can be reduced because the volume and weight of the core member 7 can be reduced by dividing the member in a parallel manner.

Figure 7:
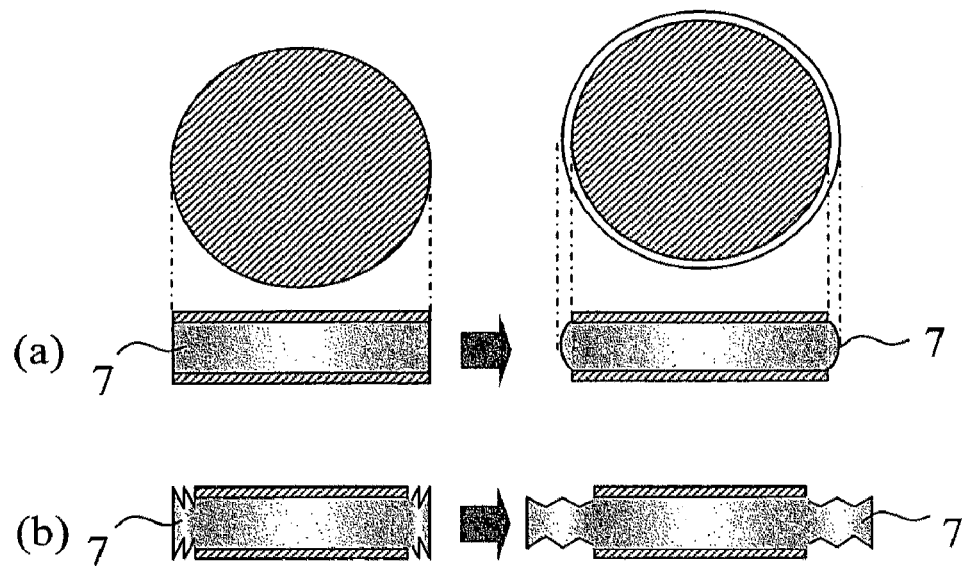
FIG. 7 is a schematic diagram showing an example of a core member having an expandable diameter.

The core member 7 may be a structure that allows the circular diameter to be modified, as shown in FIGS. 7(a) and 7(b), and a plurality of these core members may be used. In this case, vibrations when the film is conveyed and cut can be reduced because the distance between the uncut tubular resin film 1a and the core member 7 shown in FIG. 5, as well as the distance between the cut tubular resin film 1b and the core member 7, can be shortened by adjusting the circular diameter. Also, the linearity of the cut surface of the film is improved, and winding wrinkles, film meandering, and the like can be prevented because the stability of conveyance can be enhanced.

Figure 8:
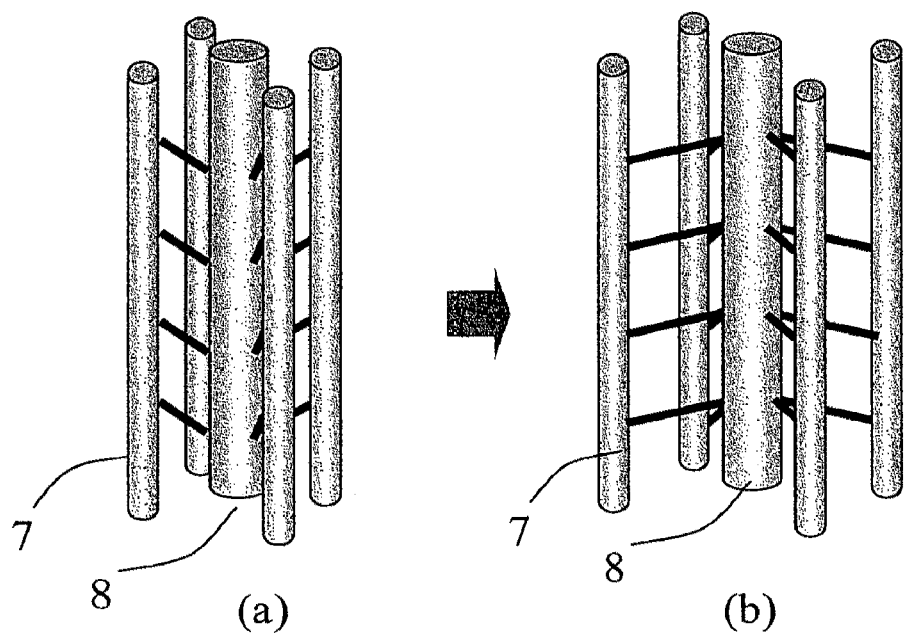
FIG. 8 is a schematic diagram showing an example in which core members have been disposed about a central rod.

As shown in FIG. 8, the distance between the uncut tubular resin film 1a and the core member 7 shown in FIG. 6a can be shortened by disposing a plurality of the divided core members 7 about a central rod 8 and adjusting the distance between the central rod and the core members. Also, vibrations when the film is conveyed and cut can be reduced because the distance between the cut tubular resin film 1b and the core members 7 can be reduced. Such a situation is preferred in that the linearity of the cut surface of the film is improved, and winding wrinkles, film meandering, and the like can be prevented because the stability of conveyance can be enhanced.

(Conveyance Device)

The conveyance device 6 has multipoint rollers disposed in the internal or external peripheral direction of the tubular resin film 1a so that the film can be conveyed while the cylindrical shape of the film is retained. The device conveys tubular resin film by driving inside and/or outside rollers and rotating the rollers in contact with the film. The rollers are preferably composed of a pliable material (e.g., silicone rubber or the like) that will not damage the surface because the rollers used in the conveyance device 6 directly contact the surface of the tubular resin film 1a. Also, the rollers are preferably arranged so as to be in contact at numerous points at equal intervals along the circumference of the tubular resin film 1a. In this manner, the tubular resin film 1a is conveyed while substantially maintaining a cylindrical shape, whereby the linearity of the cut surface is improved and the external appearance of wound film roll is enhanced when the tubular resin film is cut into a helical shape. The number of rollers arranged circumferentially may be two or more, is preferably four or more, and is most preferably eight or more. Also, the rollers may be arranged in a plurality of steps. A porous material than can exude air may be used in place of an unpowered internal roller. The winding device 4 may double as a conveyance device.

(Cutting and Winding Method)

The cutting and winding method of the present invention is characterized in having a step for cutting a tubular resin film into a helical shape, a step for guiding the cut film to the cutting device by using the guide roller, and a step for winding the film by using a winding device. The degree of freedom of the position in which the winding device 4 is disposed is increased because the direction of progression of the film can be freely modified by the guide rollers 3, as shown in FIG. 1. In particular relation to the cutting and winding device for tubular resin film, installation design is facilitated and film can be wound without winding displacement and winding wrinkles.

In the case that the cutting device and the guide rollers rotate in the circumferential direction of the tubular resin film, it is preferred that the difference between C1 and C2 be 0.1 times or less the average value of C1 and C2, and it is even more preferred that the difference between C1 and C2 be substantially 0, wherein C1 is the rotational angular velocity of the cutting device, and C2 is the rotational angular velocity the guide roller. When the difference between C1 and C2 exceeds 0.1 times the average value of C1 and C2, the film being conveyed may gradually become twisted, and winding displacement and winding wrinkles may occur.

Also, when the direction of the winding axis of the winding device does not match the direction of the center axis 5 of the tubular resin film, as shown in FIGS. 2(a) and 2(b), it is preferred that the winding device 4 rotate (revolve) about the center axis 5 of the tubular resin film so that the film is wound without wrinkles. In this case, it is preferred that the difference between the maximum and minimum values of C1, C2, and C4 be 0.1 times or less the average of C1, C3, and C4, and it is most preferred that C1, C2, and C4 be substantially the same, wherein C4 is the rotational angular velocity for turning in the circumferential direction of the tubular resin film. If the difference between the maximum and minimum values of C1, C2, and C4 exceeds 0.1 times the average of C1, C3, and C4, the film being conveyed may gradually become twisted, and winding displacement and winding wrinkles may occur.

(Winding Tension)

Depending on fluctuations in the resin exude rate of the extrusion machine, fluctuations in the rotational speed of the conveyance rollers of the conveyance device, fluctuations in the winding velocity of the winding device, increases in the winding diameter, deviations of the winding core from a perfectly circular shape, and other factors, the winding tension in the film length direction may fluctuate and produce winding wrinkles and winding displacement. Also, when the winding tension is insufficient, winding wrinkles and winding displacement readily occur due to contraction, curling, and the like in cases where there are thickness nonuniformity and stress nonuniformity in the film. Furthermore, when the angle of the winding axis of the winding device is not set to a suitable angle relative to the direction of progression of the long film, the tension in the widthwise direction of the long film loses uniformity, resulting in winding wrinkles and winding displacement. The winding must be carried out with a constant winding tension in order to avoid these problems. Although the winding tension differs depending on the material and thickness of the film, it is generally ½ to 1/50 of the mechanical strength of the film (tensile stress and the like), and it is even more preferred that the fluctuations in winding tension be less than 10%.

(Method of Adjusting the Film Width)

In the cutting and winding method of the present invention, the helical pitch of the film being cut into helical shapes can be modified by adjusting, for example, the rotational angular velocity at which the cutting device 2 shown in FIG. 1 rotates about the center axis 5 of the tubular resin film 1a, as well as the conveyance velocity of the tubular resin film on the conveyance device 6. As a result, the width of the cut film 1b can be adjusted.

$$W = \pi \cdot D \cdot \cos \theta \quad (1)$$

W: Width of the cut film (m)
D: Diameter of the tubular resin film (m)
$\theta$: Cutting angle a $\tan(C \cdot D/(2V))$
C: Rotational angular velocity (rad/min) of the cutting device about the center axis of the tubular resin film
V: Conveyance velocity of the tubular resin film (m/min)

In other words, the helical pitch becomes shorter and the cutting angle $\theta$ increases as the rotational velocity C about the center axis 5 of the tubular resin film 1a increases. As a result, the width W of the cut film is reduced. Also, the helical pitch is reduced and the cutting angle $\theta$ is increased by slowing the conveyance velocity V of the tubular resin film. As a result, the cut film width W is reduced.

When the rotational velocity C and the conveyance velocity V are modified, and the film width W is modified, the slope and position of the guide rollers 3, or the position and slope of the winding device, must be modified because the traveling position of the film changes. For example, when the rotational velocity C has increased in the cutting and winding device in FIG. 1, the cutting angle $\theta$ will increase and the traveling position of the cut film 1b will move upward toward the film advance side. In response to this, the positions of the guide rollers 3 and the winding device 4 must also be moved upward to the film advance side, or the height must be fixed and the positions must be moved from the center axis 5 of the tubular resin film 1a in the circumferential direction. Also, when the cutting and winding device is one in which a plurality of guide rollers 3 are used in the manner shown in FIG. 3(a), the traveling position of the film can be returned to its original state by modifying the positions or angles of the plurality of guide rollers 3 even when the rotational velocity C has increased, and the position of the winding device 4 does not need to be changed.

In this manner, a mechanism for automatically adjusting the film width is preferably provided that can control at least one of the following: the rotational angular velocity of the cutting device 2 that rotates in the circumferential direction of the tubular resin film, the conveyance velocity of the tubular resin film, the angle of the guide rollers 3, the position of the guide rollers 3, and the position of the winding device 4. This mechanism for automatically adjusting the film width controls the rotational angular velocity of the cutting device 2, the conveyance velocity of the tubular resin film, the angle of the guide rollers 3, the position of the guide rollers 3, or the position of the winding device 4 on the basis of signals obtained from a position sensor or the like on the end portions of the film.

Examples

The present invention is described in detail below with reference to examples and a comparative example, but the present invention is not limited to these examples.

Figure 11:
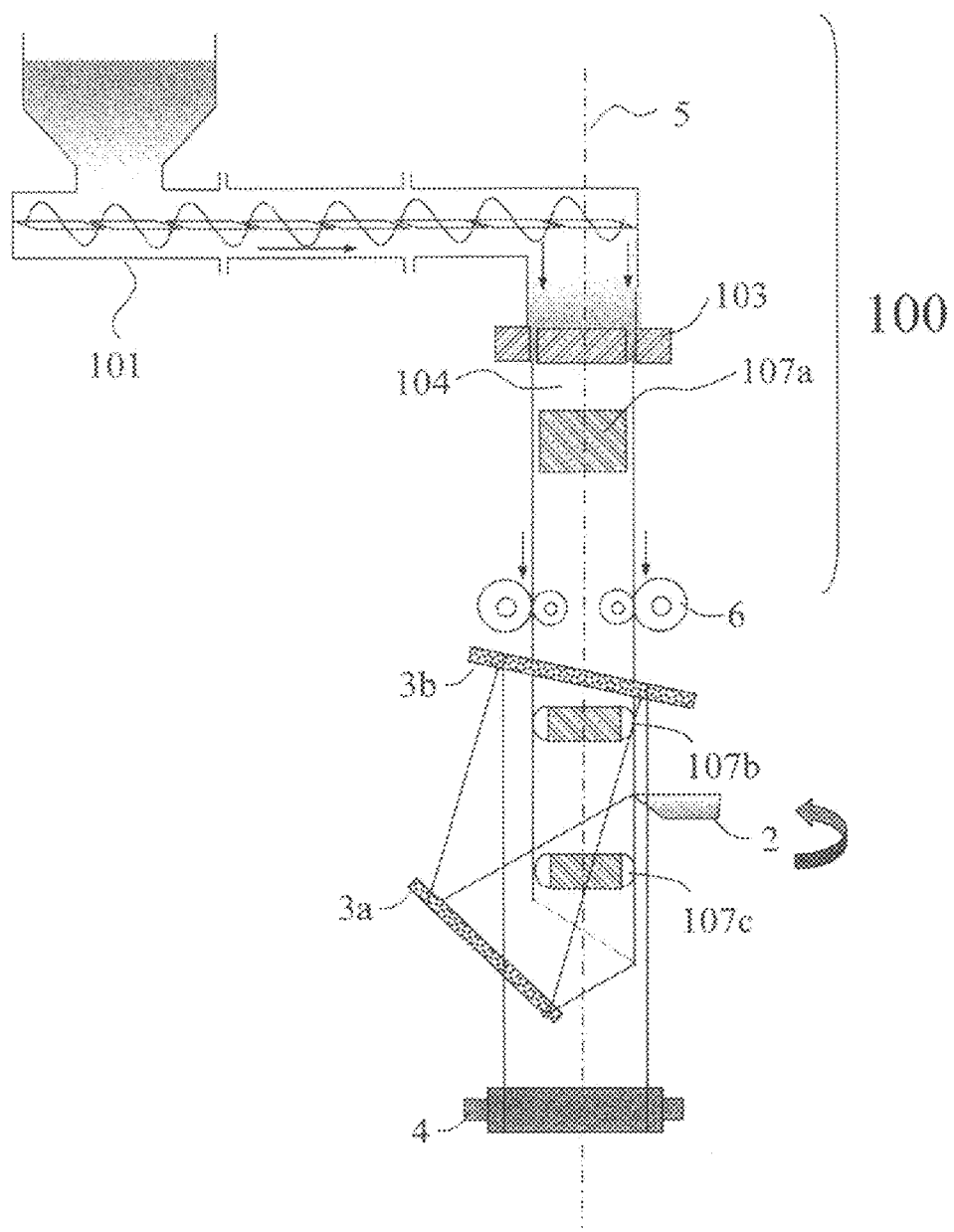
FIG. 11 is a schematic diagram showing an example in which a tubular resin film manufacturing apparatus is combined with the cutting and winding device of the present invention.

The tubular resin film manufacturing apparatus 100 shown in FIG. 11 was used in the examples and comparative examples. The cutting device in FIG. 3(a) or FIG. 3(b) was used to manufacture a long film. After the film was manufactured, the characteristics of each film were tested for the following factors: linearity of the cut portion of the film, the existence of damage on the film surface, the existence of winding wrinkles, the existence of winding displacement, and the existence of winding bumps.

The main manufacturing conditions are shown below.

(Hot Extrusion Machine 101)
Barrel circumference: 50 mm
Screw shape: Full flight single screw type
L/D: 25
Filter mesh size: 10 µm
Method: Spiral method
Extrusion machine temperature: 235° C.
(Metal Cap 103)
Nozzle shape: Parallel nozzle
Gauge: 350 mm
Metal cap temperature: 235° C.
(Stabilizing Means 104)
Structure: Separation (distance: 20 mm)
(Mandrel 107a)
Material: Metallic porous material having an average pore diameter of 35 µm
Initial outside diameter: 340 mm
Length: 50 mm
Temperature: Normal
Fluid type: Air
Fluid exuding rate: 7 L/minute
(Variable mandrels 107b, 107c)
Material: Porous powder sintered metal
Outside diameter: 340 mm (after diameter widening)
Length: 200 mm
Fluid: Air
Fluid exuding rate: 50 L/minute
(Film Material)
ARTON D4531 (JSR Inc.)

The manufacturing conditions used in the examples and comparative examples, and the results are shown in Table 1.

TABLE 1

| Cutting and winding device | | | Example 1 | Example 2 | Example 3 | Example 4 | Example 5 | Comparative example 1 | Comparative example 2 |
|---|---|---|---|---|---|---|---|---|---|
| | | | | | | Apparatus Fig. No. | | | |
| | | | FIG. 3(a) | FIG. 3(a) | FIG. 3(b) | FIG. 3(a) | FIG. 3(a) | FIG. 3(a) | FIG. 3(a) |
| Cutting device | Cutting member | Material | Metal blade | Metal blade | Metal blade | Carbon dioxide gas laser | Metal blade | Metal blade | Metal blade |

TABLE 1-continued

| Cutting and winding device | | | Example 1 | Example 2 | Example 3 | Example 4 Apparatus Fig. No. | Example 5 | Comparative example 1 | Comparative example 2 |
|---|---|---|---|---|---|---|---|---|---|
| | | | FIG. 3(a) | FIG. 3(a) | FIG. 3(b) | FIG. 3(a) | FIG. 3(a) | FIG. 3(a) | FIG. 3(a) |
| | | Blade insertion angle 2A*[2] (°) | 45 | 30 | 45 | — | 45 | 45 | 45 |
| | | Rotational angular velocity C1*[2] (rad/min) | 8.82 | 5.09 | 8.82 | 8.82 | 8.82 | 8.82 | 8.82 |
| Guide roller | Guide roller 3a | Material | Porous powder sintered metal | Porous powder sintered metal | Porous powder sintered metal | Porous powder sintered metal | Metal | — | Metal |
| | | Presence of fluid exuding | Present | Present | Present | Present | Present | — | None |
| | | Fluid type | Air | Air | Air | Air | Alcohol | — | — |
| | | Slope 3A*[3] (°) | 60 | 60 | 0 | 60 | 60 | — | 60 |
| | | Rotational angular velocity C2*[2] (rad/min) | 8.82 | 5.09 | 8.82 | 8.82 | 8.82 | — | 8.82 |
| | Guide roller 3b | Material | Porous powder sintered metal | Porous powder sintered metal | Porous powder sintered metal | Porous powder sintered metal | Metal | — | Metal |
| | | Presence of fluid exuding | Present | Present | Present | Present | Present | — | None |
| | | Fluid type | Air | Air | Air | Air | Alcohol | — | — |
| | | Slope 3B*[3] (°) | 82.5 | 75 | 22.5 | 82.5 | 82.5 | — | 82.5 |
| | | Rotational angular velocity C3*[2] (rad/min) | 8.82 | 5.09 | 8.82 | 8.82 | 8.82 | — | 8.82 |
| Winding device 4 | | Rotational angular velocity C4*[2] (rad/min) | 8.82 | 5.09 | 8.82 | 8.82 | 8.82 | 8.82 | 8.82 |
| Conveyance device 6 | | Conveyance velocity V (m/min) | 1.50 | 1.50 | 1.50 | 1.50 | 1.50 | 1.50 | 1.50 |
| | | Film width W (m) | 0.76 | 0.93 | 0.76 | 0.76 | 0.76 | 0.76 | 0.76 |
| | | Cut film linearity | Good | Good | Good | Good | Good | Poor | Poor |
| | | Film surface damage | None | None | None | None | None | Present | Present |
| | | Film wrinkles | None | None | None | None | None | Present | Present |
| | | Film displacement | None | None | None | None | None | Present | Present |
| | | Film bumps | None | None | None | None | None | Present | Present |
| Processability | | | Good | Good | Good | Good | Good | Defective*[4] | Good |

Figure 12:
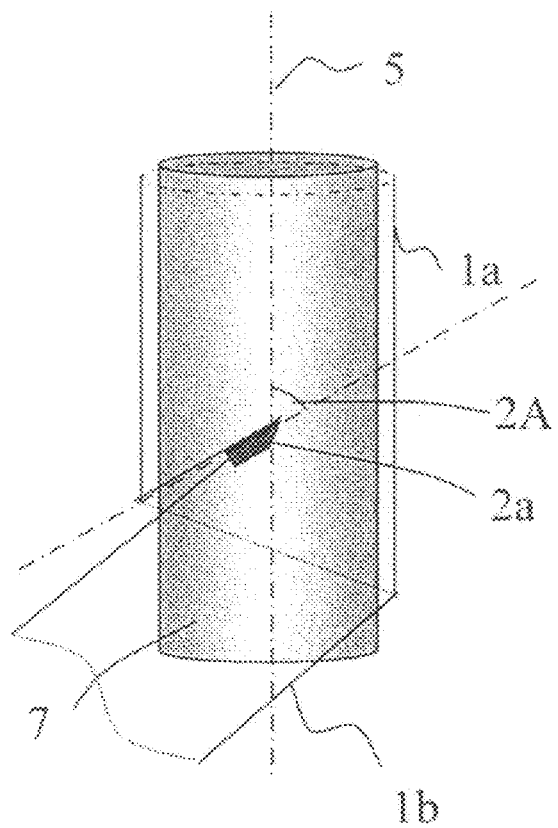
FIG. 12 is a schematic diagram showing the insertion angle (2A) of a metal blade relative to a tubular resin film.

*[1]Angle 2A in FIG. 12
*[2]Rotation with respect to the central axis 5 of the tubular resin film 1
*[3]Angle formed by the central axis 5 and the guide roll in FIG. 3
*[4]The direction of progression of the film was not stable because a guide roller was not used, and processability was poor when the film was mounted.

In examples 1 to 5 in which fluid was exuded from the guide rollers 3, the linearity of the cut portion of the film was good; damage to the film surface, winding wrinkles, winding displacement, and winding bumps were not present; and a high-quality long film was produced.

On the other hand, in comparative example 1 in which the guide rollers 3 was not used and in comparative example 2 in which fluid was not exuded from the guide roller, the linearity of the cut film surfaces of the long film was poor; damage to the film surface, winding wrinkles, winding displacement and winding bumps had occurred; and a high-quality long film was not produced.

Also, in examples 1 to 5 in which a guide roller was used and in comparative example 2 (*1), the direction of progression of the cut film was stable, and the operability of film was therefore good when the film was mounted on the winding device 4.

On the other hand, in comparison example 2 in which a guide rollers 3 was not used, the direction of progression of the cut film was not stable. Therefore, the operability of film was poor when the film was mounted on the winding device 4.

As described above, high-quality long film can be manufactured with good efficiency by using a guide roller 3 that has fluid-exuding mechanism.

INDUSTRIAL APPLICABILITY

The cutting and winding device and method according to the present invention can be used to manufacture a resin film.

In particular, the present invention can be used for optical films such as phase difference film and polarizing films, films for packaging such as shrink-wrap films, laminate films, and barrier films, and films for industry such as dicing films, carrier tapes, process films, and printing films, and the other films.

The invention claimed is:

1. A tubular resin film cutting and winding device for cutting a tubular resin film into a helical shape and winding it as a cut long film, comprising:
   a cutting device having a cutting member for cutting the tubular resin film;
   a winding device for winding the cut long film;
   a core member disposed to be inside the tubular resin film, the core member being composed of a porous material for holding a shape of a portion of the tubular resin film opposed to the cutting device, while exuding a fluid through a surface thereof; and
   a guide roller composed of a porous material for guiding the cut long film after cutting the tubular resin film to the winding device, while exuding a fluid through a surface thereof,
   wherein the cutting member and the guide roller rotate in the circumferential direction of the tubular resin film, and the cut long film is guided by the guide roller to be wound by the winding device while remaining wound around the core member.

2. The tubular resin film cutting and winding device according to claim 1, wherein the fluid exuded through the surface of the guide roller is a gas.

3. The tubular resin film cutting and winding device according to claim 1, wherein the fluid exuded through the surface of the core member is a gas.

4. The tubular resin film cutting and winding device according to claim 1, wherein the core member has a diameter thereof changeable in the circumferential direction of the tubular film.

5. The tubular resin film cutting and winding device according to claim 1, wherein the center axis of the tubular resin film matches the winding axis of the winding device.

6. The tubular resin film cutting and winding device according to claim 1, wherein the winding device is rotatable in the circumferential direction of the tubular resin film.

7. The tubular resin film cutting and winding device according to claim 1, wherein an exchange device that can continuously exchange film rolls wound in the winding device is provided.

8. The tubular resin film cutting and winding device according to claim 1, wherein two or more each of the cutting members and the guide rollers are provided.

9. The tubular resin film cutting and winding device according to claim 1, wherein the width of the cut long film is automatically adjustable based on the rotational angular velocity at which the cutting device rotates in the circumferential direction of the tubular resin film, and based on the conveyance velocity of the tubular resin film.

10. The tubular resin film cutting and winding device according to claim 1, wherein two or more conveyance devices conveying the tubular resin film in the lengthwise direction are provided to a circumference of the tubular resin film.

11. The tubular resin film cutting and winding device according to claim 1, wherein the guide roller includes an inner space for introducing the fluid.

12. The tubular resin film cutting and winding device according to claim 1, wherein the guide roller is divided into a plurality of sections in a longitudinal direction thereof for separately controlling the amount of fluid exuded therethrough.

13. A cutting and winding method for cutting a tubular resin film into a helical shape and winding it as a cut long film, including:
    a step in which a cutting device having a cutting member for cutting the tubular resin film rotates in the circumferential direction of the tubular resin film to thereby cut a helical long film;
    a step in which a core member is disposed inside the tubular resin film, the core member being composed of a porous material and holding a shape of a portion of the tubular resin film opposed to the cutting device while exuding a fluid through a surface thereof;
    a step in which a guide roller composed of a porous material rotates in the circumferential direction of the tubular resin film while exuding a fluid to thereby guide the cut long film to a winding device while the cut long film remains wound around the core member; and
    a step for winding the long film using the winding device.

14. The cutting and winding method according to claim 13, wherein the width of the long film is automatically adjusted based on the rotational angular velocity at which the cutting device rotates in the circumferential direction of the tubular resin film, and based on the conveyance velocity of the tubular resin film.

15. The cutting and winding method according to claim 13, wherein the arrangement of the guide roller and/or the winding device is adjusted in coordination with the rotational angular velocity of the cutting device and/or the conveyance velocity of the tubular resin film.

* * * * *